(12) United States Patent  (10) Patent No.: US 7,540,109 B2
Hall  (45) Date of Patent: Jun. 2, 2009

(54) HUMANE TRAP FOR SMALL ANIMALS

(76) Inventor: Chad W. Hall, P.O. Box 654, Owings, MD (US) 20736

( * ) Notice: Subject to any disclaimer, the term of this patent is extended or adjusted under 35 U.S.C. 154(b) by 0 days.

(21) Appl. No.: 11/700,514

(22) Filed: Jan. 31, 2007

(65) Prior Publication Data

US 2008/0178516 A1    Jul. 31, 2008

(51) Int. Cl.
    *A01M 23/20* (2006.01)
(52) U.S. Cl. .................... 43/61; 43/58; 43/60; 43/67
(58) Field of Classification Search ............. 43/61, 43/60, 58, 65, 67
    See application file for complete search history.

(56) References Cited

U.S. PATENT DOCUMENTS

| | | | | |
|---|---|---|---|---|
| 26,883 A | * | 1/1860 | Buttles | 43/61 |
| 60,143 A | * | 12/1866 | Clarke | 43/61 |
| 107,647 A | * | 9/1870 | Bachman | 43/61 |
| 283,171 A | * | 8/1883 | Walker | 43/67 |
| 340,269 A | * | 4/1886 | Wiggins | 43/61 |
| 383,972 A | * | 6/1888 | Mittler | 43/61 |
| 443,975 A | * | 12/1890 | Pead | 43/61 |
| 472,687 A | * | 4/1892 | Winkler | 43/61 |
| 516,937 A | * | 3/1894 | Leflet | 43/61 |
| 530,723 A | * | 12/1894 | Scheibel | 43/67 |
| 636,901 A | * | 11/1899 | Johnson | 43/61 |
| 665,847 A | * | 1/1901 | Barton | 43/61 |
| 690,171 A | * | 12/1901 | Mills | 43/61 |
| 723,100 A | * | 3/1903 | White | 43/61 |
| 760,738 A | * | 5/1904 | Huguley | 43/67 |
| 897,302 A | * | 9/1908 | Olson | 43/61 |
| 971,530 A | * | 10/1910 | Draper | 43/61 |
| 986,010 A | * | 3/1911 | Kennedy | 43/61 |
| 1,011,207 A | * | 12/1911 | Kemp | 43/61 |
| 1,024,278 A | * | 4/1912 | Niederlitz | 43/61 |
| 1,054,050 A | * | 2/1913 | Stanberry | 43/67 |
| 1,243,088 A | * | 10/1917 | Mazurek | 43/61 |
| 1,255,798 A | * | 2/1918 | Schuckman | 43/61 |
| 1,399,630 A | * | 12/1921 | Livezey | 43/61 |
| 1,406,028 A | * | 2/1922 | Keller | 43/61 |
| 1,406,091 A | * | 2/1922 | Schuirmann | 43/67 |
| 1,486,663 A | * | 3/1924 | Hills | 43/67 |

(Continued)

FOREIGN PATENT DOCUMENTS

CH     643710 A     6/1984

(Continued)

*Primary Examiner*—Darren W Ark
(74) *Attorney, Agent, or Firm*—Lawrence E Laubscher, Sr.; Lawrence E Laubscher, Jr.

(57) ABSTRACT

An humane trap for small animals, such as cats, includes a housing having rigid bottom, top, side, front and rear end walls which cooperate to define an animal-receiving chamber, the front end wall being guided for vertical movement between opened and closed positions relative to the other housing walls. A retaining rod is axially displaceable within the chamber between a retaining position in which an end portion of the rod extends through a retaining opening contained in the second wall to maintain the same in the open position, and a released position removed from the retaining opening, whereby the second wall is displaced by gravity downwardly toward the closed position. The retaining rod is released either by a food retention plate that is engaged by the animal in the trap, or by a remotely controlled solenoid arrangement.

14 Claims, 4 Drawing Sheets

U.S. PATENT DOCUMENTS

| | | | | |
|---|---|---|---|---|
| 1,587,536 A * | 6/1926 | Lobit | | 43/61 |
| 1,654,434 A * | 12/1927 | Senecal | | 43/61 |
| 1,703,990 A * | 3/1929 | Daniels | | 43/61 |
| 1,713,167 A * | 5/1929 | Bushman | | 43/61 |
| 1,735,786 A * | 11/1929 | Pearl | | 43/61 |
| 1,747,108 A * | 2/1930 | Evans | | 43/61 |
| 1,759,048 A * | 5/1930 | Fisher | | 43/61 |
| 1,846,851 A * | 2/1932 | Dodge | | 43/65 |
| 1,866,776 A * | 7/1932 | Sloulin | | 43/61 |
| 1,913,823 A * | 6/1933 | Witte | | 43/61 |
| 1,918,266 A * | 7/1933 | Henry | | 43/61 |
| 1,937,260 A * | 11/1933 | Young | | 43/61 |
| 2,023,427 A * | 12/1935 | Laughlin | | 43/61 |
| 2,087,646 A * | 7/1937 | Houghton | | 43/61 |
| 2,268,468 A * | 12/1941 | Adams | | 43/61 |
| 2,446,168 A * | 8/1948 | Bricker | | 43/61 |
| 2,447,147 A * | 8/1948 | Warner | | 43/61 |
| 2,478,605 A * | 8/1949 | Symens | | 43/61 |
| 2,510,168 A * | 6/1950 | Caldwell et al. | | 43/61 |
| 2,587,349 A * | 2/1952 | Mace | | 43/67 |
| 2,594,855 A * | 4/1952 | Bloodgood | | 43/61 |
| 2,803,918 A * | 8/1957 | Hall | | 43/61 |
| 2,824,405 A * | 2/1958 | Brooks | | 43/61 |
| 3,200,534 A * | 8/1965 | Wood et al. | | 43/61 |
| 3,585,750 A * | 6/1971 | Routt | | 43/61 |
| 3,624,951 A * | 12/1971 | Gilbaugh | | 43/61 |
| 3,791,065 A * | 2/1974 | Snow | | 43/69 |
| 3,823,504 A * | 7/1974 | Dosch | | 43/61 |
| 3,834,063 A * | 9/1974 | Souza et al. | | 43/61 |
| 3,918,194 A * | 11/1975 | Waske | | 43/61 |
| 4,031,653 A * | 6/1977 | Jordan | | 43/61 |
| 4,161,079 A * | 7/1979 | Hill | | 43/58 |
| 4,179,835 A * | 12/1979 | Hunter | | 43/61 |
| 4,266,362 A * | 5/1981 | Campbell et al. | | 43/66 |
| 4,310,984 A * | 1/1982 | Brubaker, Jr. | | 43/61 |
| 4,546,568 A * | 10/1985 | Seyler | | 43/61 |
| 4,590,704 A * | 5/1986 | Volk | | 43/61 |
| 4,682,441 A * | 7/1987 | Straver | | 43/61 |
| 4,763,439 A * | 8/1988 | Smith | | 43/61 |
| 4,766,692 A * | 8/1988 | Shurden | | 43/61 |
| 4,782,620 A * | 11/1988 | Syszczyk et al. | | 43/61 |
| 4,829,701 A * | 5/1989 | ImBrogno | | 43/61 |
| 4,899,484 A * | 2/1990 | Morin | | 43/61 |
| 4,912,872 A * | 4/1990 | Wynn et al. | | 43/61 |
| 4,984,382 A * | 1/1991 | Yost | | 43/61 |
| 5,199,210 A * | 4/1993 | Nastas | | 43/61 |
| 5,299,380 A * | 4/1994 | Fornal, Sr. | | 43/66 |
| 5,345,710 A * | 9/1994 | Bitz | | 43/61 |
| 5,386,663 A * | 2/1995 | Fields | | 43/66 |
| 5,588,249 A * | 12/1996 | Flinner | | 43/61 |
| 5,778,594 A * | 7/1998 | Askins et al. | | 43/61 |
| 5,791,292 A * | 8/1998 | Jempolsky | | 43/61 |
| 5,864,982 A * | 2/1999 | Tully et al. | | 43/61 |
| 5,867,934 A * | 2/1999 | Conover | | 43/61 |
| 6,164,008 A * | 12/2000 | Kelley | | 43/61 |
| 6,202,340 B1 * | 3/2001 | Nieves | | 43/61 |
| 6,263,612 B1 * | 7/2001 | Shultz | | 43/61 |
| 6,484,672 B1 * | 11/2002 | Versaw | | 43/61 |
| 6,543,179 B1 * | 4/2003 | Lee | | 43/61 |
| 6,609,327 B2 * | 8/2003 | Stoico et al. | | 43/61 |
| 6,618,982 B2 * | 9/2003 | Lafforthun | | 43/61 |
| 6,622,422 B2 * | 9/2003 | Gehret et al. | | 43/61 |
| 6,694,669 B2 * | 2/2004 | Gehret et al. | | 43/61 |
| 6,955,007 B2 * | 10/2005 | Gehret et al. | | 43/61 |
| 6,990,766 B2 * | 1/2006 | Gehret et al. | | 43/61 |
| 7,026,942 B2 * | 4/2006 | Cristofori et al. | | 43/61 |
| 7,051,472 B1 * | 5/2006 | Kelly | | 43/61 |
| 2002/0011019 A1 * | 1/2002 | Stoico et al. | | 43/58 |
| 2002/0035801 A1 * | 3/2002 | Ogura | | 43/61 |
| 2004/0107630 A1 * | 6/2004 | Evans et al. | | 43/61 |
| 2005/0097808 A1 * | 5/2005 | Vorhies et al. | | 43/61 |
| 2007/0017148 A1 * | 1/2007 | Blau | | 43/61 |

FOREIGN PATENT DOCUMENTS

| | | | |
|---|---|---|---|
| DE | 19857452 A1 * | 6/2000 | |
| FR | 2586900 A1 | 3/1987 | |
| FR | 2832293 A1 * | 5/2003 | |
| GB | 2173085 A | 10/1986 | |
| GB | 2193425 A * | 2/1988 | |
| GB | 2258381 A * | 2/1993 | |
| GB | 2292063 A * | 2/1996 | |
| JP | 08154560 A * | 6/1996 | |
| JP | 2002142650 A * | 5/2002 | |
| JP | 2005341852 A * | 12/2005 | |
| WO | WO 2007080233 A1 * | 7/2007 | |

\* cited by examiner

FIG. 14

HUMANE TRAP FOR SMALL ANIMALS

BACKGROUND OF THE INVENTION

1. Field of the Invention

An humane trap for small animals, such as cats, includes a housing having rigid bottom, top, side, and front and rear end walls which cooperate to define an animal-receiving chamber, the front end wall being guided for vertical movement between opened and closed positions relative to the other housing walls. A retaining rod is axially displaceable within the chamber between a retaining position in which an end portion of the rod extends through a retaining opening contained in the second wall to maintain the same in the open position, and a released position removed from the retaining opening, whereby the front end wall is displaced by gravity toward the closed position. The retaining rod is released either by a food retention plate that is engaged by the animal in the trap, or by a remotely controlled solenoid arrangement.

2. Description of Related Art

Traps for small animals, such as cats, are well known in the patented prior art, as shown by the patents to Versaw U.S. Pat. No. 6,484,672, Brubaker U.S. Pat. No. 4,310,984, Jordan U.S. Pat. No. 4,031,653 and Campbell U.S. Pat. No. 4,266,362, among others. In these trapping devices, the housings and components may be formed from conventional synthetic plastic materials. It is also known to provide these animal traps with synthetic plastic bait plates, as shown by the patents to Nieves U.S. Pat. No. 6,202,340 and Fields U.S. Pat. No. 5,386,663.

The present invention was developed to provide an improved inexpensive, humane animal trap that is positive in operation either by the animal itself in the trap chamber, or by remote control means spaced a substantial distance from the trap housing.

SUMMARY OF THE INVENTION

Accordingly, a primary object of the present invention is to provide an humane animal trap including a rectangular housing having rigid bottom, side, end, and top walls that cooperate to define a chamber, a food retention plate mounted in the chamber to position food for attracting a small animal, such as a cat, into the chamber, a retaining rod arranged in the chamber and operable in a retaining position to maintain a movable housing front end wall in an open position, and release means for operating the rod to a released position, thereby to permit displacement of the front end wall by gravity toward the closed position. In one embodiment of the invention, the release rod is connected with a hinged transparent perforated food retention plate that is pivoted by an animal in the trap chamber seeking food behind the plate, thereby to operate the rod toward its released position. In a second embodiment, the retaining rod is displaced toward the released position by remotely controlled means fastened to the external surface of a side wall of the trap housing, and operated by a remotely positioned transmitter by an observer of the trap.

According to a more specific object of the invention, the retaining rod is guided for sliding movement in the housing chamber and includes a first end having an orthogonally extending pivot pin adapted for removable connection with the pivotally moveable food retention plate, and a linear second end guided for insertion into a retention opening contained in the moveable end wall when said end wall is in the open position. The intermediate portion of the retaining rod includes a lateral guide member that extends through a guide opening contained in one of the housing side walls. When the first end of the retaining rod is disconnected from the food retention plate, the retaining rod is operable by a remotely-controlled solenoid that is mounted on the external surface of the housing side wall and includes a plunger that is connected with the lateral guide member of the rod. When the first end of the retaining rod is connected with the food retention plate, the retaining rod is operated by the animal that has been attracted by the food into the chamber.

A further object of the invention is to provide a food retention plate that is formed of a rectangular transparent synthetic plastic material, the plate being perforated, upwardly extending, and having an inverted generally L-shaped cross-sectional configuration. Hinge means serve to pivotally connect the bottom edge of the food retention plate with the bottom wall in spaced relation to the rear housing end wall, the upper end of the plate extending at an acute angle in the direction of the rear end wall. Thus, the housing side walls, the rear end wall, the bottom wall, the angularly arranged lower portion of the food retention plate and the rearwardly extending upper portion of the food retention plate cooperate to define a space for receiving food that serves as bait for attracting the small animal into the chamber.

Another object of the invention is to provide an humane animal trap including a housing having perforated bottom, side and one rear end wall molded as an integral unit by injection molding a suitable synthetic plastic material. A front wall is guided between a pair of metal guide channels for vertical displacement between open and closed positions relative to the housing integral unit. The top wall of the housing is pivotally connected with the rear wall for pivotal movement between open and closed positions, the top wall containing a viewing opening in which is mounted a transparent plate that is covered by a pivotally displaceable opaque lid member.

A primary object of the improved animal trap is to be as careful as possible not to injure the small animal when trapping and/or transporting feral, frightened or already injured animals. Another goal is to keep the configuration and operation as simple and straight forward as possible in order to provide a highly reliable trap and to encourage inexperienced trappers to trap when trapping is necessary. The trap is designed to resemble dark areas that cats and other small animals love to enter and explore. Even extremely cautious and trap-smart animals are lured into the trap.

The animal trap of the present invention is designed to protect the animal from adverse weather conditions, including direct sunlight, and from other animals outside the trap in the event that the animal is trapped for a long period of time. The trap provides shade and ventilation adequate to protect the trapped animal from direct sunlight and to maintain a temperature lower than that found in a wire trap exposed to direct sunlight.

The retaining rod is operable either by an animal-actuated food retention plate connected with the rod first end within the chamber, or by a remotely-controlled solenoid mounted on the external surface of one of the housing side walls. The trapped animal is more at ease because of the four walls, and will not fight frantically to escape. All surfaces, including the release mechanism, are solid and smooth, so that the animal is unlikely to hurt itself when trapped or during transport. The trap is designed to be quiet when sprung. Therefore, the animal is less likely to be alarmed, and other animals in the area are not frightened away. This is important when several traps are provided to trap a colony.

The remote activation allows for selective trapping of animals. This feature enables the trapping out of feline colonies for trap, neuter/spay and return procedures; and for avoiding undesirable animals, such as skunks or raccoons. The trapping can be done at a distance, either from a concealed location, for from the comfort of a porch or living room. The radio controlled remote control operation encourages inexperienced persons with an animal problem to engage in trapping that animal.

The food restriction plate may be used as a separate accessory for all types of traps, including wire and box type traps. It is designed to present the bait food to the animal without enabling the animal to reach the food. This feature greatly increases the likelihood that the animal will trigger the trap's release mechanism. The food restriction plate is also designed to avoid injury to the animal during trapping or transportation. It is made of smooth, transparent plastic material so that the animal can see and smell the bait food. The size of the perforations in the plate and the spacing distance between the plate and the housing rear wall are such that the animal cannot get its claws or teeth on or around the plate, and the animal cannot hurt itself either trying to get to the food or trying to get out of the trap.

According to a further object of the invention, top wall locking means are provided for locking the top wall, when in the closed position, to the housing integral unit, and front wall locking means serve to lock the front end wall, when in the closed position, to the housing integral unit.

Another object of the invention is to provide a removable intermediate vertical divider wall between the rear wall and the food retention plate, thereby to define a space for receiving kittens that would attract into the chamber a nursing mother cat.

Still another object is to provide flexible carrying strap means fastened to the side walls of the housing for manually lifting and transporting the trap.

BRIEF DESCRIPTION OF THE DRAWINGS

Other objects and advantages of the invention will become apparent from a study of the following specification, when viewed in the light of the accompanying drawing, in which.

DETAILED DESCRIPTION OF THE INVENTION

Figure 1:
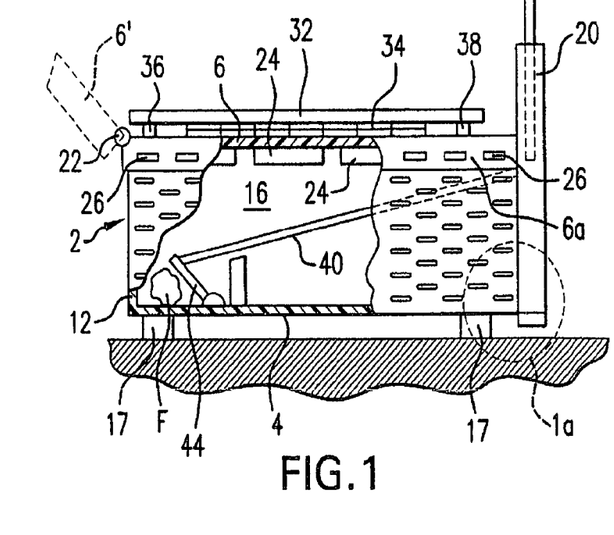
FIG. 1 is a side elevation view of the humane animal trap with certain parts broken away.
Figure 1A:
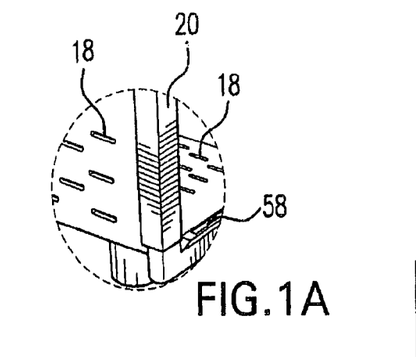
FIG. 1*a* is a detailed perspective view of a front bottom portion of the animal trap of FIG. 1.
Figure 2:
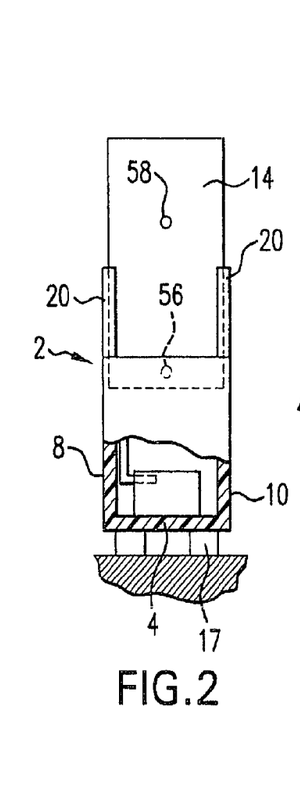
FIGS. 2 and 3 are left hand and right hand end views, respectively, of the apparatus of FIG. 1.
Figure 3:
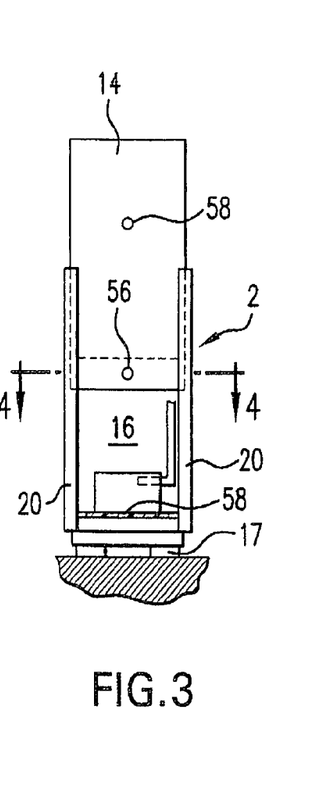
Figure 4:
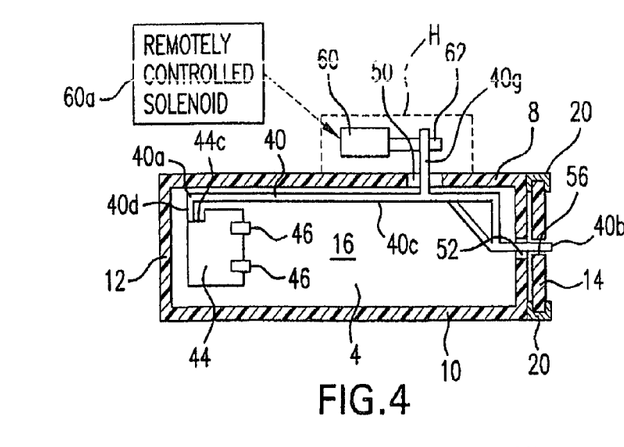
FIG. 4 is a sectional view taken along line 4-4 of FIG. 3.

Referring first more particularly to FIGS. 1-3, the humane animal trap of the present invention includes a housing 2 having horizontal bottom and top walls 4 and 6, a pair of side walls 8 and 10, a rear end wall 12, and a front end wall 14, which walls cooperate to define a central chamber 16. The housing walls are planar, rigid, and formed from a suitable opaque synthetic plastic material, such as ABS, PVC, polypropylene, polystyrene or the like. In the preferred embodiment, the bottom, side and rear end walls are formed by injection molding to define a rigid integral unit having integral support feet 17. The support feet serve to stabilize the trap when used on uneven terrain, to keep an animal trapped in the central chamber dry during wet weather conditions, and to afford ventilation to the chamber via the perforations in the bottom wall. At least the bottom, side and rear end walls of the housing contain a plurality of elongated ventilating perforations 18, as best shown in FIG. 1*a*. The perforations are generally elliptical, and arranged with their major axes in a horizontal orientation. The front end wall 14 is guided for vertical sliding movement between open and closed positions relative to the housing within a pair of opposed U-shaped metal guide members 20 (FIG. 4) that are fastened to the housing adjacent the front edges of the side walls, respectively.

The housing top wall 6 has a generally inverted U-shaped cross-sectional configuration and is pivotally connected at one end by first hinge means 22 with the upper end of the rear end wall 12, thereby to permit the top wall to be pivoted rearwardly about the horizontal pivot axis of the hinge means 22 toward the open position 6' shown in phantom. When in the closed position, the top wall 6 is seated on the upper edges of the side walls 8 and 10, which upper edges contain a plurality of longitudinally-spaced ventilating slots 24 (FIG. 1). The width of the top wall is greater than the spacing distance between the housing side walls, whereby the side edges of the top wall extend beyond the side walls and terminate in downwardly extending flange portions 6*a* (FIGS. 1 and 11) that contain a plurality of oblong ventilating openings 26.

Figure 5:
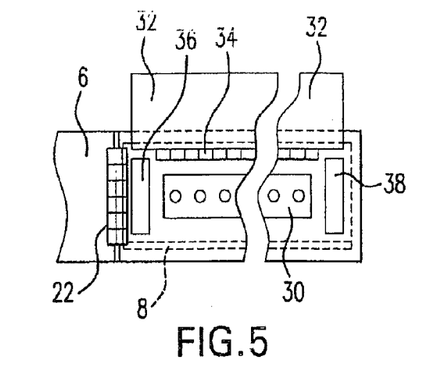
FIG. 5 is a top view of the animal trap housing of FIG. 1 with the viewing lid pivoted to the viewing position.
Figure 6:
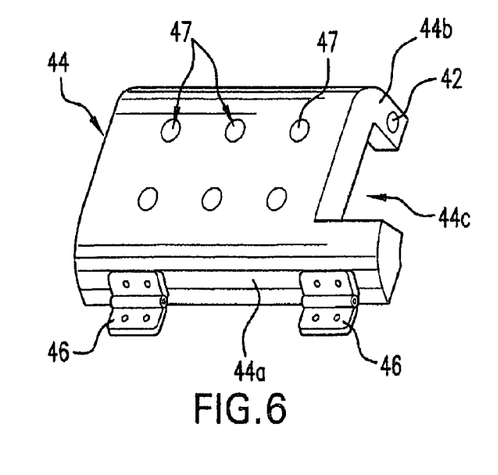
FIGS. 6 and 7 are a perspective front view and a rear view, respectively, of the food retention plate of the animal trap of FIGS. 1-4.
Figure 7:
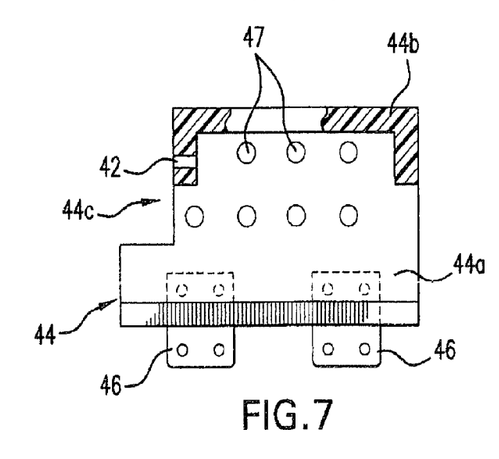

Referring to FIG. 5, the top wall 6 contains a central opening in which is mounted a transparent viewing plate 30, thereby to define a viewing window for viewing of the interior of the chamber when the top wall is in the closed position. The viewing window is normally covered by an opaque covering lid 32 that is pivotally connected at one longitudinal side edge with the top wall 6 adjacent the side wall by second hinge means 34 having a horizontal axis, thereby to permit upward pivotal movement of the covering lid to an open viewing position 6' illustrated in phantom in FIGS. 1 and 5. Support blocks 36 and 38 support the covering lid, when in the illustrated horizontal covering position, in spaced relation a small distance above the upper surface of the top wall 6, thereby to afford ventilation to the chamber 16.

Referring now to FIGS. 4 and 8-10, in accordance with a characterizing feature of the present invention, in order to retain the second end wall 14 in the upper open position, a retaining rod 40 is provided that is guided for axial siding movement within the housing chamber 16. The retaining rod includes first and second end portions 40*a* and 40*b* adjacent the first and second housing end walls 12 and 14, respectively, and an intermediate portion 40*c* that extends parallel with and spaced from the inner surface of the housing side wall 8. At its first end 40*a*, the retaining rod includes and orthogonally extending pivot pin portion 40*d* that removably extends within a corresponding pivot opening 42 contained in an end wall in the notched portion 44*a* of a rectangular transparent synthetic plastic food retention plate 44. The food retention plate has a generally inverted L-shaped cross-sectional configuration and includes a lower edge portion 44*a* that is pivotally connected with the housing bottom wall 6 by hinge means 46 for pivotal movement about a horizontal pivot axis that is parallel with and spaced from the rear end wall 12, thereby to define a space for receiving a quantity of food F (FIG. 1) that serves as bait for attracting a small animal, such as a cat, into the chamber 16. The upper portion 44b of the food retention plate is offset in the direction of the rear end wall 12, and the plate contains a plurality of perforations 47.

At its other end, the retaining rod end portion 40b is linear and is laterally offset from the rod intermediate portion 40c by the offset portion 40e that is braced by the support portion 40f. The rod includes also a lateral guide arm portion 40g that extends orthogonally outwardly of the chamber through the guide slot 50 contained in the housing side wall 8. The linear free end 40b of the retaining rod slidably extends through a guide hole 52 (FIG. 4) contained in a housing frame cross-support 54 that extends horizontally between the upper front edge portions of the housing side walls 8 and 10. When the housing front end wall 14 is in its upper open position shown in FIGS. 1-3, and when the retaining rod is in its illustrated retaining position, the linear end portion 40b extends through a corresponding retaining hole 56 contained in the lower central portion of the front wall 14, thereby to retain the front end wall in its open position. When the front end wall 14 is in its closed position, the second end portion of the retaining rod is adapted to extend through a second opening 58 contained in the upper central portion of the front end wall, thereby to permit the food retention plate to be raised and disconnected from the retaining rod so that food can be placed behind the food retention plate.

As indicated above, when the retaining rod is axially displaced in the direction of the rear end wall 12, the second end portion 40b of the retaining rod is withdrawn from the retaining opening 56 in the front end wall 14, whereupon the front end wall drops by gravity toward the closed position. In order to cushion and deaden the sound of the impact of the front end wall when it reaches the closed position, a resilient strip of cushioning material 58 (FIGS. 1a and 3) is secured to the upper surface of the bottom wall of the housing beneath the front end wall 14.

Operation

In operation, assume that the food retention plate 44 is in the rearwardly inclined food retaining position of FIGS. 1-3, that food F is placed in the space between the food retention plate and the housing rear wall 12, that the pivot shaft portion 40d on the first end 40a of the retaining rod 40 extends into the pivot opening 42 contained in the end of the notch 44a contained in the food retention plate (FIG. 4), that the front wall 14 is in its upper open position, and that the free extremity of the retaining rod linear second portion 40b extends into the retaining opening 56 contained in the lower central portion of the front wall 14, thereby to retain the front wall in the open position.

When the cat or other small animal attracted by the bait enters the housing chamber 16, the animal, in its effort to reach the bait, engages the food retaining plate 44 and pivots the same rearwardly toward the rear end wall 12, whereupon the retaining rod second end portion 40b is withdrawn from the retaining opening 56, and the front wall is released to fall by gravity toward the closed position, as cushioned by the resilient cushioning strip 58. Owing to the perforations 18 contained in the bottom, side, rear end and top walls, the perforations 26 contained in the top wall flange portions 6b, and the slots 24 in the upper side wall edges, the animal is provided with adequate ventilation to remain in comfort within the dark cool chamber 16. The operator of the trap may lift the viewing lid 32 to view the animal via the transparent window 30, and to remove the animal from the trap, the user pivots the top wall 6 to the open position shown in phantom in FIG. 1.

Figures 8, 9, 10:
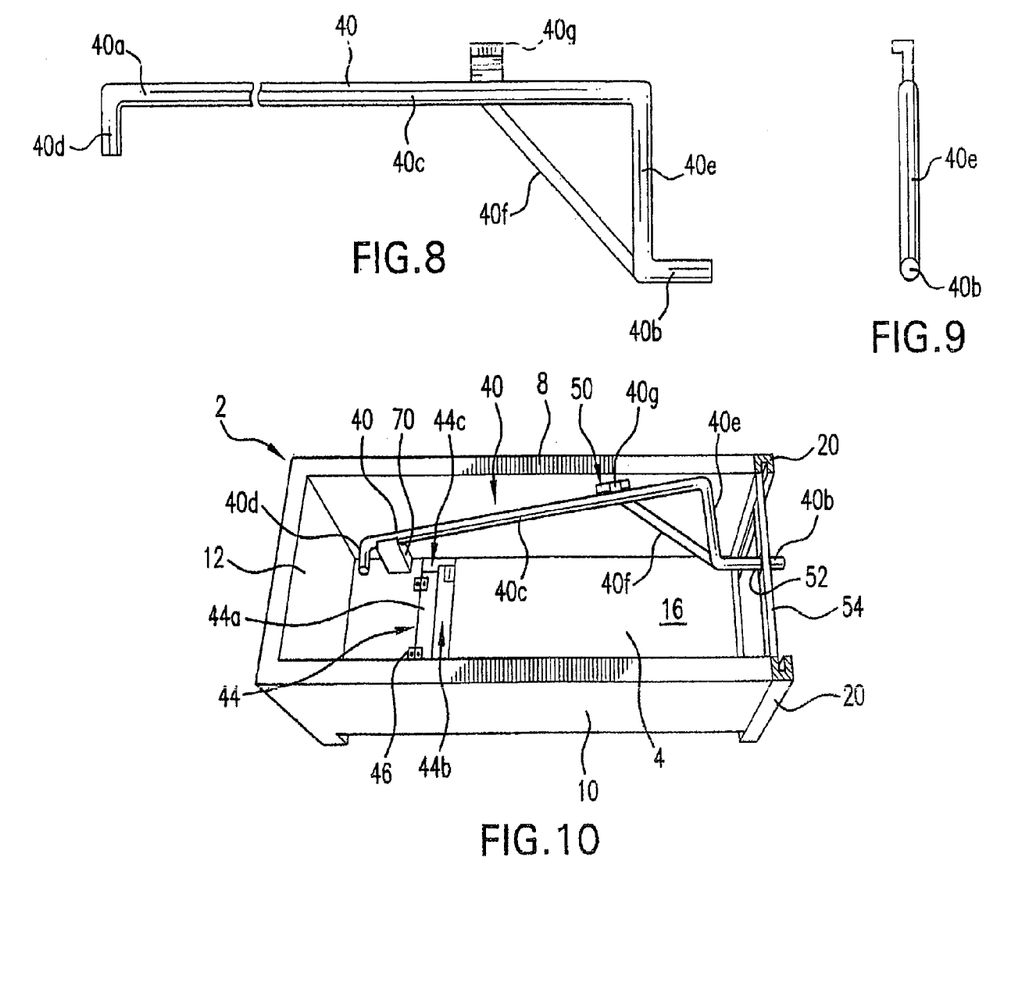
FIGS. 8 and 9 are top plan and end views, respectively, of the retaining rod used in the animal trap of FIG. 1.
FIG. 10 is a top perspective view, with certain parts removed, illustrating the operation of the retaining rod of FIG. 8 relative to the housing of FIGS. 1-4.

According to an important feature of the invention, the retaining rod 40 may be operated from the retaining position to the released position by conventional remote control means. To this end, the pivot pin 40d at the first end 40a of the retaining rod is disconnected from the food retention plate 44, and the rod first end is supported by the fixed support 70 for sliding movement in the chamber 16, as shown in FIG. 10. The housing H of a normally de-energized remotely controlled solenoid 60 (FIG. 4) is secured to the external surface of the housing side wall 8, which solenoid has a movable plunger 62 that is connected with the lateral guide member 40g that extends laterally of the release rod intermediate portion 40c through the guide opening 50. Following the insertion of food in the chamber adjacent the rear wall 12, the food retention plate is pivoted upwardly toward the vertical rearwardly inclined position of FIG. 1. When an observer positioned at a hidden location remote from the animal trap sees an desired animal lured by the bait into the chamber, the solenoid is energized by conventional remote control operating means 60a, and the plunger 62 is retracted relative to its housing H, thereby to displace the retaining rod 40 rearwardly toward its released position, whereby the retaining rod second end 40b is disengaged from the retaining opening 56, and front wall 14 falls by gravity to its closed position. One example of a suitable remotely controlled solenoid system is the commercially available BLAZER SPORT pistol-grip transmitter-receiver apparatus sold by AIRTRONICS INC. of Anaheim, Calif.

Although the housing of the animal trap of the present invention is preferably formed by the injection molding of a suitable synthetic plastic material, it will be apparent that the device could be constructed from wood, perforated pressboard, metal, or similar rigid material.

Figures 11, 12, 13, 14:
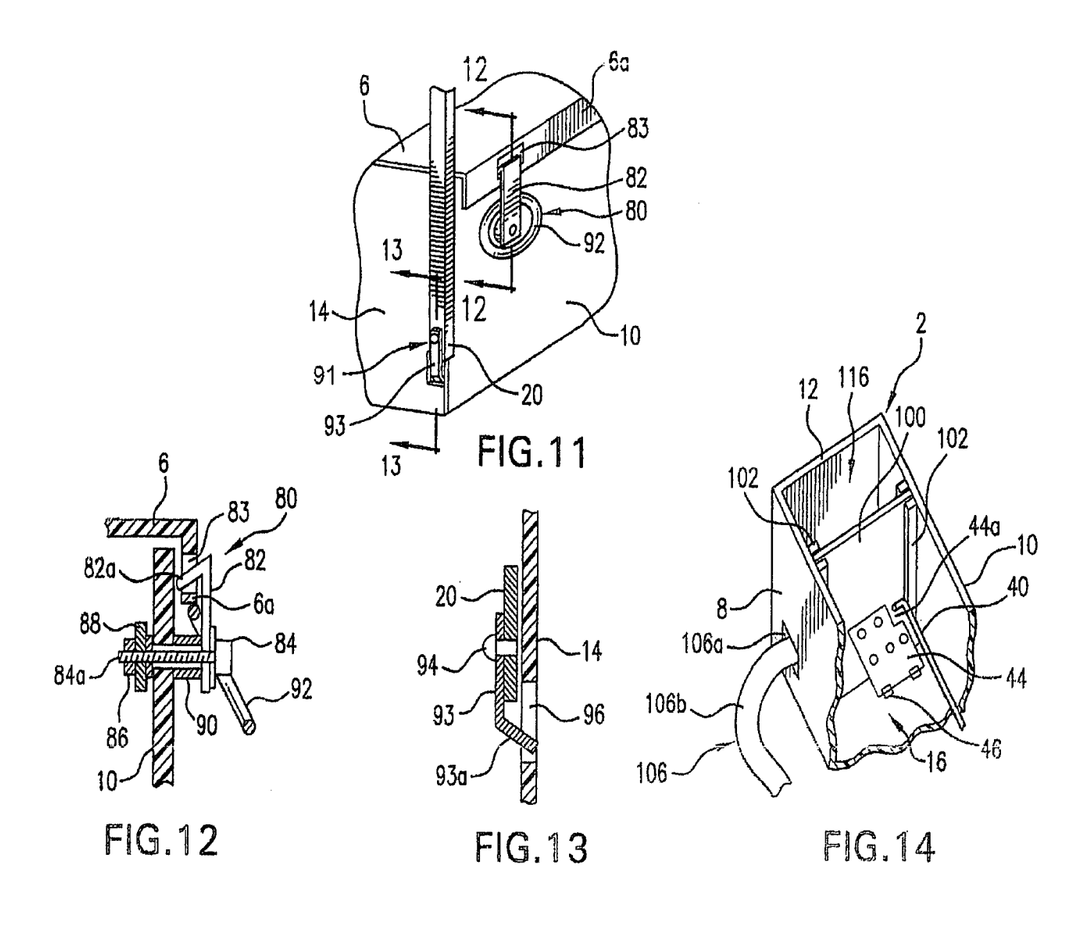
FIG. 11 is a detailed perspective view of a modification of the invention including top wall and front wall locking means.
FIGS. 12 and 13 are sectional views taken along lines 12-12 and 13-13, respectively, of FIG. 11.
FIG. 14 is a detailed perspective view of a further modification of the subject invention.

Referring now to FIGS. 11 and 12, top wall locking means 80 are provided for automatically locking the top wall 6 to the side walls 8 and 10 when the top wall is lowered to it normally closed horizontal position. More particularly, the resilient metal locking clip 82 is bolted at its lower end to the associated side wall 10 by means of bolt 84, spacer sleeve 90, washer 88, and nut 86 that is mounted on the screw threaded bolt end 84a. At its upper end, the locking clip is provided with an offset angularly-downwardly-bent locking portion 82a that is resiliently biased into the locking opening 83 provided in the flange portion 6a of the top wall 6. To release the metal clip from its illustrated locking condition, a release ring 92 is provided for manually pulling the upper locking portion 82a of the clip out of the locking opening 83.

Similarly, front wall locking means 91 are provided for automatically locking the front wall to the housing when the front wall is in the closed position. To this end, a second metal resilient clip 93 is fastened at its upper by rivet 94 to the metal guide channel 20, with the angularly-inwardly-bent lower end portion 93a of the clip being biased toward the notch 96 formed in the adjacent edge of the front end wall. To unlock the front end wall, the user merely manually withdraws the lower end portion of the clip from the slot 96.

According to another feature of the invention, a removable transparent vertical divider wall 100 may be provided in the chamber 16 between the food retaining plate 44 and the rear wall 12, thereby to define a chamber 116 for receiving one or more kittens to attract a nursing mother cat into the chamber 16. The transparent divider wall is guided by fixed U-shaped guide channels 102 for vertical displacement relative to the housing 2. Two flexible carrying straps 106 are provided for lifting the housing with or without an animal trapped within the chamber 16. Each strap has a pair of end portions 106a fastened to the external surface of the associated side wall, and an intermediate gripping or handling portion 106b.

While in accordance with the provisions of the Patent Statutes the preferred forms and embodiments of the invention have been illustrated and described, it will be apparent to those skilled in the art that changes may be made without deviating from the invention described above.

What is claimed is:

1. A humane animal trap, comprising:
   (a) a rectangular housing having horizontal vertically spaced top (6) and bottom (4) walls, a pair of vertical parallel side walls (8 and 10), and front (14) and rear (12) end walls, said walls cooperating to define a chamber (16),
      (1) said walls being formed from a rigid synthetic plastic material;
      (2) at least some of said walls being perforated to define a plurality of ventilation openings;
      (3) said bottom, side and rear walls being formed as an integral unit, said side walls having horizontal opposed upper edges that contain a plurality of longitudinally spaced ventilating slots (24);
      (4) said top wall being pivotally connected with said integral unit for movement about first pivot means (22) between a normally closed horizontal position and an open position relative to said chamber, said top wall having in transverse cross-section a generally inverted U-shaped configuration including a horizontal portion having a width greater than a distance between said side walls, and a pair of integral flange portions (6a) that respectively extend both downwardly from said horizontal portion and in spaced relation relative to outer surfaces of said side walls when said top wall is in said closed position, said flange portions containing a plurality of longitudinally spaced ventilating openings (26);
      (5) said housing including guide means (20) guiding said front end wall for vertical displacement between a lower closed position and an upper open position relative to said chamber;
   (b) retaining means operable between a retaining condition retaining said front end wall in said upper open position, and a released condition permitting said front end wall to be in its closed position relative to said chamber;
   (c) a transparent rectangular food retention plate (44) arranged in said chamber adjacent and spaced from said rear end wall, said food retention plate having a horizontal lower edge pivotally connected with said bottom wall, said food retention plate extending upwardly from said bottom wall toward a food retention position defining with said rear wall a space for receiving food; and
   (d) release means for operating said retaining means from said retaining condition to said released condition, thereby to permit said front end wall to be displaced by gravity toward said closed position, whereby when an animal is attracted into the chamber by the food and the release means is operated to the released condition, the front end wall is closed and the animal is trapped in said chamber.

2. The humane animal trap as defined in claim 1, wherein said retaining means includes:
   (1) a retaining rod (40) arranged in said chamber parallel with and spaced from one of said housing side walls, said retaining rod having first (40a) and second (40b) end portions and an intermediate portion (40c);
   (2) retaining rod guide means (52) supporting said retaining rod for axial displacement between said retaining and released conditions relative to said chamber, said retaining rod second end portion being linear and adapted to extend, when said retaining rod is in said retaining condition and said front end wall is in its open position, within a retaining opening (56) contained in said front end wall, thereby to retain said front end wall in its open position.

3. The humane animal trap as defined in claim 2, wherein said release means comprises connecting means connecting said retaining rod first end portion with said food retention plate, whereby upon engagement of said food retention plate by an animal in said chamber seeking the food behind said food retention plate, said retaining rod is displaced toward said released condition, thereby to permit said front end wall to be displaced by gravity toward its closed position relative to said chamber.

4. The humane animal trap as defined in claim 3, wherein said food retention plate includes a first end surface containing a pivot bore (42), and further wherein said retaining rod includes a linear fastening portion (40d) that extends orthogonally from said retaining rod first end portion into said pivot bore, said retaining rod first end portion being adapted for disconnection from said food retention plate; and further including retaining rod support means (70) for supporting said rod when in a disconnected condition in said chamber.

5. The human animal trap as defined in claim 2, wherein said release means includes remotely controlled solenoid means (60) for displacing said retaining rod from said retaining condition toward said released condition, whereupon said front end wall is released for gravity displacement toward its closed position.

6. The human animal trap as defined in claim 5, wherein said rod guide means includes a guide projection (40g) that extends orthogonally outwardly from said retaining rod intermediate portion through a guide opening (50) contained in said one of said housing side walls, said guide projection terminating externally of said housing, said solenoid means including a stationary housing (60) secured to said one of said housing side walls, and a movable element (62) connected with said guide projection, said solenoid means normally being in a de-energized condition in which said retaining rod is in said retaining condition, said solenoid means being operable to an energized condition in which said retaining rod is displaced toward said released condition.

7. The humane animal trap as defined in claim 1, wherein said ventilation openings (18) are generally elliptical and have major axes that are horizontal, thereby to maximize a size of the ventilation openings.

8. The humane animal trap as defined in claim 1, and further including a cushioning strip (58) formed from a resilient cushioning material mounted on said bottom wall below said front end wall for cushioning said front end wall when it is displaced by gravity from said open position to said closed position.

9. The humane animal trap as defined in claim 1, wherein said top wall (6) contains a viewing opening; and further including a transparent viewing plate (30) mounted in said viewing opening, and a covering lid member (32) pivotally connected with said top wall adjacent and parallel with one of said side walls for pivotal displacement about a longitudinal horizontal pivot axis (34) between a horizontal covering position above said transparent viewing plate, and a viewing position displaced angularly upwardly from said covering position.

10. The humane animal trap as defined in claim 1, and further including top wall locking means (80) for locking said top wall to said housing integral unit when said top wall is in said horizontal closed position, said top wall locking means comprising a first resilient metal clip (82) fastened to one of said side walls, said clip having a fastening portion (82*a*) arranged for engagement within a corresponding first locking slot (82) contained in the adjacent top wall flange portion when said top wall is in said closed position; and further including top wall unlocking means (92) for unlocking said clip fastening portion from said first locking slot.

11. The human animal trap as defined in claim 1, and further including front wall locking means (91) for locking said front wall to said housing integral unit when said front end wall is in said lower closed position.

12. The human animal trap as defined in claim 11, wherein said front wall locking means comprises a second resilient metal clip (93) fastened to said guide means, said second resilient clip having a locking portion (93*a*) adapted to extend within a corresponding locking slot (96) contained in said front wall.

13. The human animal trap as defined in claim 1, and further including:
   (e) divider wall means defining an animal-receiving space in said chamber between said rear end wall and said food retention plate, said divider wall means including:
      (1) a vertical transparent synthetic plastic divider wall (100) arranged in said chamber between, parallel with, and spaced from said rear end wall and said food retention plate; and
      (2) guide means (102) guiding said divider plate for vertical displacement relative to said integral housing unit.

14. The human animal trap as defined in claim 1, and further including:
   (e) carrying strap means connected with external surfaces of said side walls, said carrying strap means including a pair of flexible carrying straps (106) each having a pair of end portions connected with the external surfaces of said side walls, and an intermediate gripping portion.

* * * * *